(12) United States Patent
Cashmore et al.

(10) Patent No.: US 9,304,976 B1
(45) Date of Patent: Apr. 5, 2016

(54) POSITIONING MEDIA TO GO VIRAL (71) Applicant: Mashable, Inc., New York, NY (US)

(72) Inventors: Peter Cashmore, New York, NY (US);
Robyn Peterson, New Canaan, CT (US);
Chris Heald, Gilbert, AZ (US); Dimitri Dimoulakis, New York, NY (US);
Mario Antonetti, Manchester, NH (US);
Kevin Gisi, New York, NY (US);
Darren Tome, New York, NY (US);
Adam Ostrow, New York, NY (US)

(73) Assignee: Mashable, Inc., New York, NY (US)

( * ) Notice: Subject to any disclaimer, the term of this patent is extended or adjusted under 35 U.S.C. 154(b) by 238 days.

(21) Appl. No.: 14/086,069

(22) Filed: Nov. 21, 2013

(51) Int. Cl.
*G06F 17/00* (2006.01)
*G06F 17/21* (2006.01)

(52) U.S. Cl.
CPC ..................................... *G06F 17/212* (2013.01)

(58) Field of Classification Search
None
See application file for complete search history.

(56) References Cited

U.S. PATENT DOCUMENTS

| 8,806,000 | B1 * | 8/2014 | Wattenhofer et al. | 709/224 |
|---|---|---|---|---|
| 2010/0220978 | A1 * | 9/2010 | Ogikubo | 386/95 |
| 2011/0082719 | A1 * | 4/2011 | Dutta | G06F 17/30035 705/7.29 |
| 2012/0102404 | A1 * | 4/2012 | Tiu et al. | 715/719 |
| 2013/0091147 | A1 * | 4/2013 | Kim | G06F 17/30663 707/748 |
| 2013/0117349 | A1 * | 5/2013 | Burnette et al. | 709/202 |
| 2013/0159826 | A1 * | 6/2013 | Mason | G06F 17/30873 715/205 |
| 2013/0346154 | A1 * | 12/2013 | Holz | G06Q 30/0201 705/7.31 |
| 2015/0088635 | A1 * | 3/2015 | Maycotte | G06Q 30/0244 705/14.43 |
| 2015/0331553 | A1 * | 11/2015 | Shaffer | G06F 3/013 715/765 |

* cited by examiner

*Primary Examiner* — Keith Bloomquist
(74) *Attorney, Agent, or Firm* — Morris & Kamlay LLP

(57) ABSTRACT

Systems and techniques are disclosed for positioning, based on a position velocity measure, related media content within a media outlet such as a website, a blog, an aggregation page, an application, or the like. The related media content may be related to a media content and may link to the media content, be a derivative of the media content, summarize the media content, or the like. A location within a media outlet for a related media content may be determined and the related media content may be published accordingly. The location of a related media content may be modified from a first location to a second location. The size of a related media content may be increased and/or a related media content may be highlighted. Further, techniques are disclosed for publishing related media content within a zone from a plurality of zones associated with a media outlet.

24 Claims, 9 Drawing Sheets

Fig. 9

POSITIONING MEDIA TO GO VIRAL

BACKGROUND

Millions of media items are published on a daily basis, but only a relative handful become wildly popular. The popularity of a media item (or "media content") can be related to how many different places it is published and how frequently it is posted, forwarded, marked as important or otherwise shared by users. Extensive sharing of a media item can benefit from the so-called "network effect," whereby a person can share a media item with several friends, each of whom can share it with several friends and so on. A media item that is widely shared and gains a high degree of popularity due to the network effect is said to have gone "viral," and may be called a "viral media item.

BRIEF SUMMARY

According to implementations of the disclosed subject matter, a determination may be made that a velocity measure corresponding to a media content exceeds a velocity criterion. The velocity measure may be based on a change in engagement rate for the media content. The media content may be an image, a video, a text, an audio, a link or the like. A second media content may be received and may be based on the media content or link to that media content. The media content or the second media content will be referred to as the publishable media content herein. The publishable media content may be positioned based on determining that the velocity measure corresponding to the media content exceeds the velocity criterion. Positioning the publishable media content may include selecting an applicable media outlet and publishing the publishable media content on the selected media outlet. Alternatively or in addition, positioning the publishable media content may include determining a first location of the publishable media content on a given media outlet, determining a second location for the publishable media content on the media outlet, and modifying the location of the publishable media content from the first location to the second location. Alternatively or in addition, a first location of the publishable media content on a media outlet may be determined and the size of the publishable media content may be increased. Alternatively or in addition, a first location of the publishable media content on a media outlet may be determined and the publishable media content may be highlighted. Alternatively or in addition, positioning the publishable media content may include publishing the publishable media content based on a selected zone.

Systems and techniques according to the present disclosure position media to go viral. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

According to implementations of the disclosed subject matter, potentially viral media content may be identified and published in a way that can improve the likelihood that the content will actually go viral. The publishable media content may include a related content related to the identified media content and/or may be an original media item for which a velocity measure exceeds a velocity threshold. The publishable media content may be positioned based on a velocity measure associated with the media content meeting or exceeding a location velocity criterion, as disclosed herein. Alternatively or in addition, the publishable media content may be located at a first position and the arrangement may modify the position of the related media content such that it is moved to a second position. Here, the second position may be more or less visible to a user. Alternatively or in addition, the publishable media content may be expanded and/or highlighted such that the revised publishable media content is more visible to a user that accesses a media outlet that contains the publishable media content.

According to implementations of the disclosed subject matter, the potentially viral media content may be identified by scanning one or more media sources. The media sources may be web pages, blogs, article publication websites, news websites, social media sites, or the like. A media source may be identified based on one or more criteria such as a predetermine selection, a sub source found within an original media source, or the like. Media content within the media source may be identified based on discovery criteria such as an engagement rate (e.g., number of times the content has been shared, viewed, otherwise accessed, etc.) and the arrangement may calculate a velocity measure associated with the media content, as disclosed herein. The velocity measure may be based on a change in engagement rate for the media content. For example, the velocity measure may represent the change in shares per minute for the media content. The arrangement may determine that the velocity measure for the media content exceeds a velocity threshold and, based on the determination, may take a subsequent action such as publishing related media content. The velocity threshold may be predetermined (e.g., a value such as 5 shares per minute, per minute), may be dynamically determined by the arrangement based on either the type of media content (e.g., image, video, text, etc.) or engagement rate (e.g., share, mention, etc.). A publication of related media content may be an article or snippet derived from the media content such as an article about the media content, or any other applicable related media content as disclosed herein.

Figure 1:
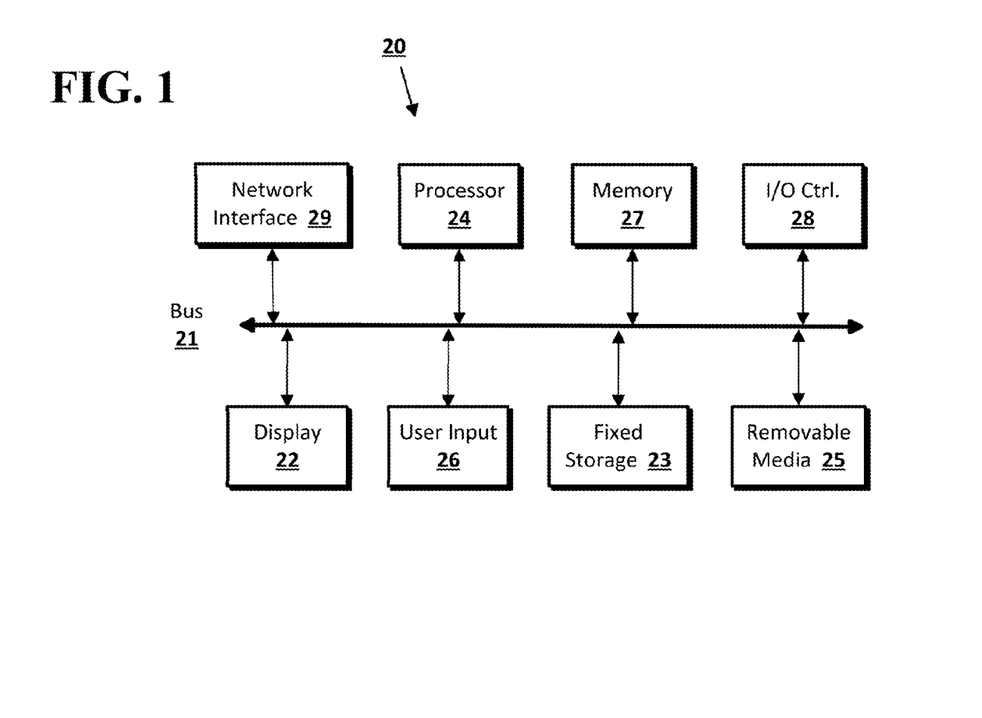
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. The fixed storage may store one or more, media content, URL links, related media content, velocity measure, engagement rate, change in engagement rate or the like. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected or communicated with in a similar manner (e.g., mobile devices, document scanners, image scanners, Bluetooth™ devices, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
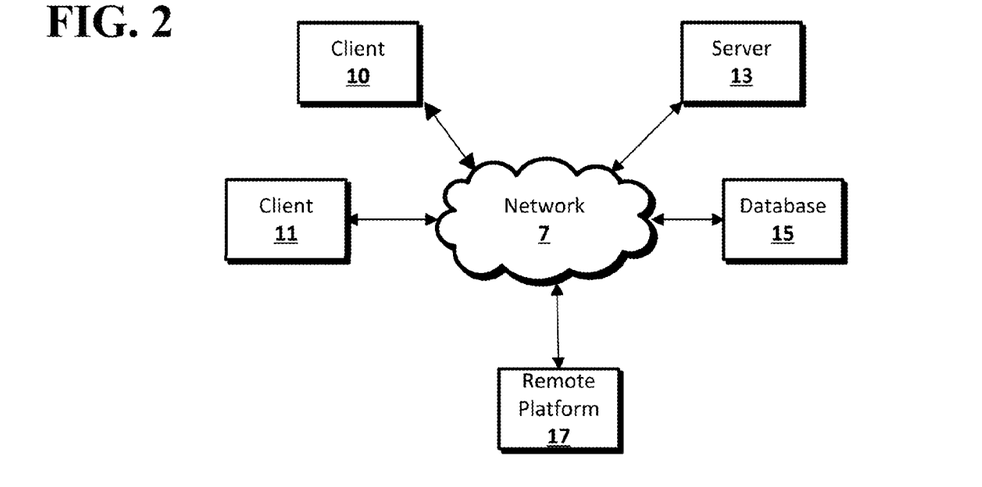
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, Blu-Ray™ discs, DVD discs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
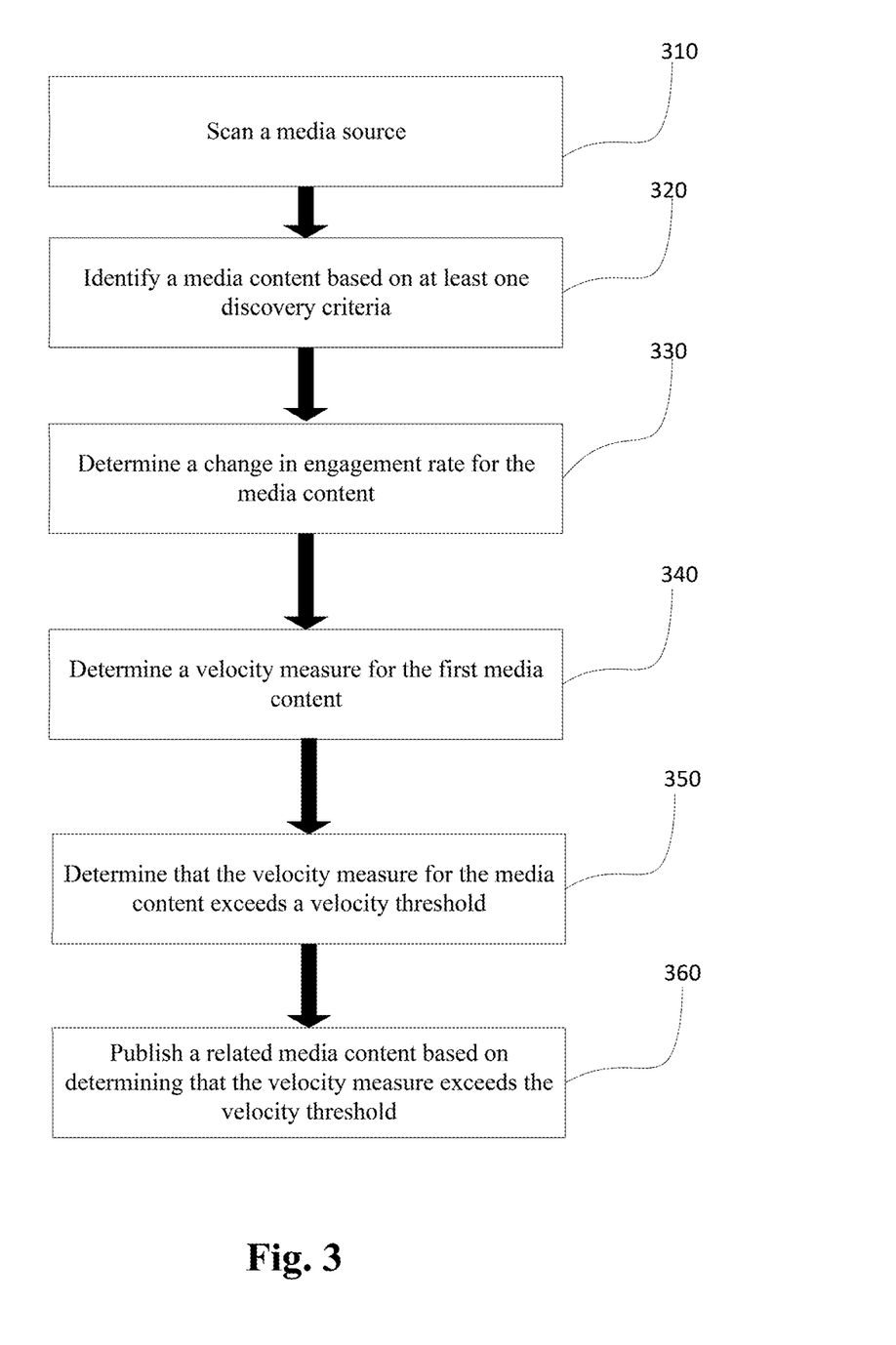
FIG. 3 shows an example process for publishing publishable media content, according to an implementation of the disclosed subject matter.

As shown in FIG. 3, at step 310, the arrangement may scan a media source such as a website or a blog. At step 320, the arrangement may identify media content based on at least one discovery criteria and, at step 330, may determine a change in engagement rate for the identified media content. At step 340, a velocity measure for the media content may be determined and may be based on the change in engagement rate. The velocity measure may be derived from the change in engagement rate in any applicable manner such as by adding one or more weights to the change in engagement rate. At step 350, the arrangement may determine that the velocity measure for the media content exceeds a velocity threshold and, based on this determination, at step 360, may publish related media content. The related media content may be any applicable content as disclosed herein, such as content derived based on the media content.

According to implementations of the disclosed subject matter, as shown in FIG. 3 at step 310, the arrangement may scan a media source. A media source may be any applicable source such as a website, a blog, an aggregation page, an application, or the like. The source may be a news related source, entertainment related source, educational source, social media source, community form (e.g., a forum where members of the community provide content to the forum such that other members are provided access to the content via the forum), a comment (e.g., the source may be a comment on a forum, the comment submitted by a user in response to a news article to which the user responds to), a response (e.g., to a comment, to media content, etc.), or the like.

The arrangement may identify a media source to scan based on any applicable criteria such as a previously or currently identified media source by a human (e.g., a user may provide a media source for the arrangement to scan, a user may provide a type of media source for the arrangement to scan, etc.), or computer (e.g., a media source may be automatically identified based on parameters such as threshold traffic values, click through, amount of time spent on a page, or the like). The arrangement may further identify a second media source based on a first, initial, media source. The second media source may be extracted by identifying a connection to the second media source from the first media source. As an example, a first media source may contain links to other webpages. The arrangement may detect these links and designate the destination webpage corresponding to the one or more links as a media source.

One or more media source locations may be stored by the arrangement such that the one or more locations are accessible at a later time. Continuing the previous example, the second media source may be identified by the arrangement via the first source during a first time. The arrangement may store the location of the second media source (e.g., via a URL). At a second, subsequent time, the arrangement may access and scan the second media source based on the stored location.

According to an implementation of the disclosed subject matter, as shown at step 320, media content may be identified based on any applicable discovery criteria. The media content may be any applicable content such as an image (e.g., a JPEG, PNG, TIF, BMP, etc.), a video (e.g., an MPEG, AVI, MOV, etc.), an audio (e.g., a MP3, MP4, WAV, etc.), a graphics interchange format, a text string (e.g., an article, comment, blog post, an expert, a, paragraph, a sentence, a title, etc.) or the like. As a specific example a media content may be a video related to a user's experience in New York City posted by the user to a video sharing website. Additionally, a second user may provide a comment in association with the video regarding her experience in the same areas of New York City that are depicted in the video. Both the video and the comment may be identified as media content. Alternatively, the video may be identified as media content or the comment may be identified as media content. It will be understood that although specific examples of media content are provided herein, the implementations are not limited to those examples as any applicable media content may be identified by the arrangement.

Discovery criteria may be any applicable criterion that enables the arrangement to identify the media content as potentially viral content. The discovery criteria may be a threshold amount of engagement such as views, clicks, shares, posts, likes, suggestions, links to, and mentions of a given media content. As a specific example, the arrangement may track the number of times the link to an image has been posted across social media websites. If the number of times meets or exceeds a predetermined threshold, then the arrangement may identify the media content and track its engagement rate, as disclosed herein. Alternatively, the discovery criteria may be whether a given content is related to one or more of interest topics. The arrangement may be provided with or may determine of interest topics based on any applicable criteria such as current events (e.g., a sporting event), currently trending topics (e.g., a musical performance aired on television), topics that will become relevant based on anticipated events (e.g., a pending election), or the like. Accordingly, media content may be identified based on the topic that the content is associated with. As a specific example, a user may instruct the arrangement to flag content that is related to a financial crisis that may occur if certain actions are not taken by a national government within two days. Accordingly, the arrangement may scan a media source that contains an article which contains detailed analysis regarding the pending financial crisis by an expert in the field. Accordingly, the arrangement may identify the media content based on the user provided discovery criteria (e.g., content that is related to the financial crisis). As another example, the discovery criteria may be a threshold number media sources which contain links to the media content. More specifically, the arrangement may identify media content if the media content is linked to in a threshold number of media sources (e.g., at least 5 distinct sources).

At step 330, the arrangement may determine a change in engagement rate for the identified media content. An engagement rate may be a measure of a number of clicks, shares, likes, suggestions, posts, mentions, or the like. A click may be selection of the media content or a link to the media item by a user. Here, the arrangement may process the clicks through fraud detectors such that illegitimate clicks are ignored (e.g., via bot detection software). A share may be associated with one or more users providing the media content to one or more other users. A share may occur via any applicable manner such as via an electronic mail, an account user interface, a website, a social media platform, Short Messaging Service message, software, an application, or the like. As an example, a first user may view the media content via a social media platform and select an option to place a link for the media content on a page associated with another user within the same social media platform. A like may be associated with a user approval of, agreement with, and/or support towards media content. As an example, a user may select an icon associated with a media content to indicate agreement with the message provided by the media content. The selection may be visually presented to the user and/or other users as associated with the media content. A suggestion may be a recommendation of media content by a user. The suggestion may be directed at one or more other users or may be directed to a general population. A user may suggest specific media content to another user via any applicable manner such as via an electronic mail, an account user interface, a website, a social media platform, Short Messaging Service message, software, an application, or the like. As an example, a user may submit a link for media content to a second user's social media page. A post may be a publication of media content by a user such that one or more other users may view the publication. As an example, a user may post a link to media content on the user's social media page such that the post is seen by other users that are connected to the original user. A mention may be any applicable reference to media content and may be embedded within text, a share, a suggestion, a post, or the like. As an example, a user may provide a status via an instant messaging service. The status may include text along with a link to media content.

The arrangement may detect the engagement rate in any applicable manner such as by monitoring instances of the media content, monitoring instances of links to the media content, monitoring one or more sources (e.g., websites, blogs, etc.) via which a user may engage with the media content, or the like. As an example, the arrangement may track one or more social media websites and detect whenever a link to an article is posted via the social media website. Each post and/or a selection of link to the article may be designated as an engagement. The engagement may be recorded by the arrangement and stored at any applicable storage device such as a local server, a remote server, a cloud based server, a database, or the like. The arrangement may detect the engagement rate for given media content for a limited amount of time. The time may be determined based on a change in engagement rate, as disclosed herein, a predetermined time period, a time period determined based on an original engagement rate corresponding to when the media content was identified by the arrangement, or the like. As an example, the arrangement may determine that the media content is a video and, based on a predetermined value of 3 days for videos, may store the engagement rate for the media content for 3 days. Essentially, the arrangement may determine whether a media content is a potentially viral media content and, if it is not a potential media content, may stop monitoring the media content.

Figure 5:
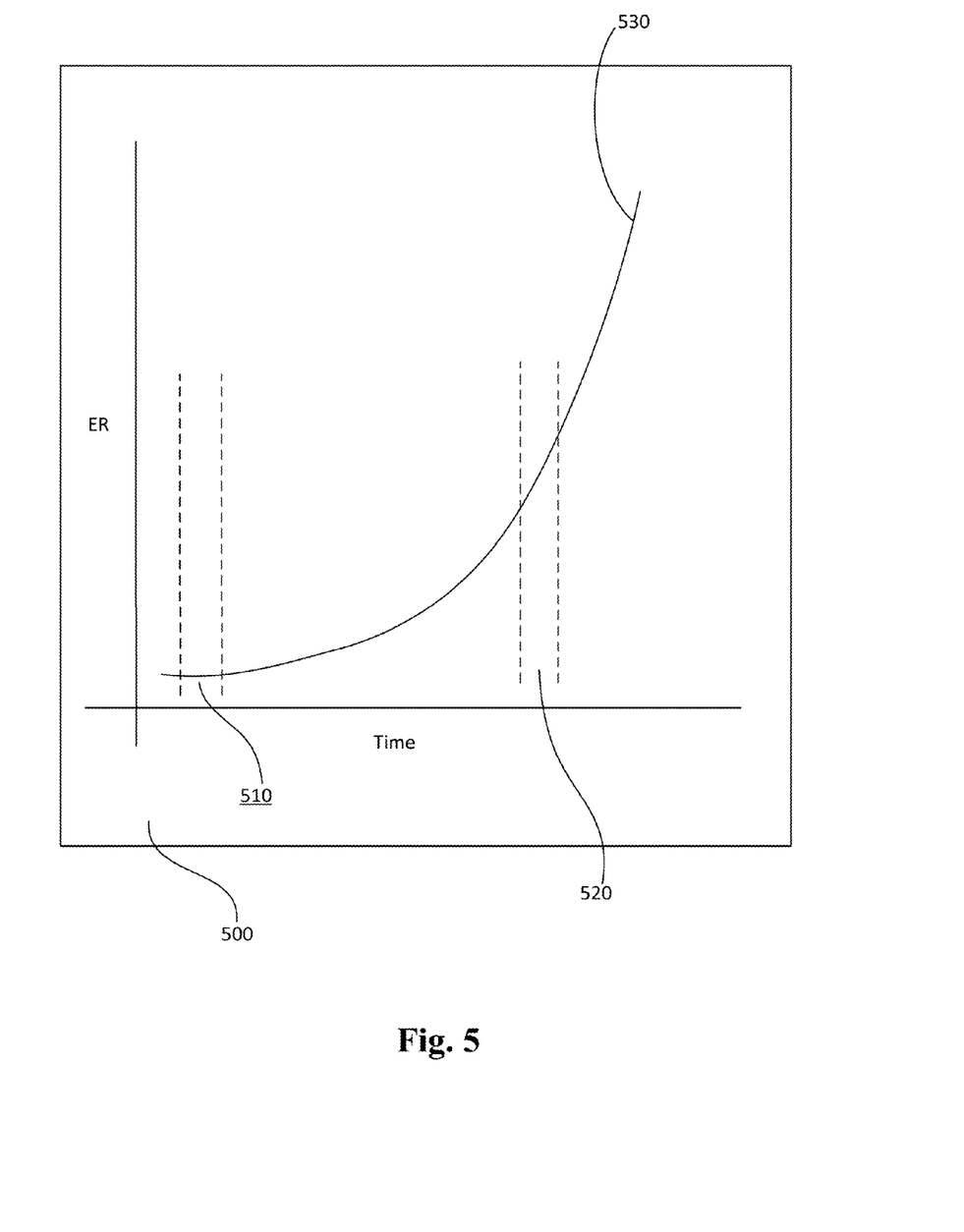
FIG. 5 shows an example illustration for change in engagement rate, according to an implementation of the disclosed subject matter.

A change in engagement rate for a media item may be calculated in any applicable manner such that an initial engagement rate is compared to a subsequent engagement rate. For example, the initial engagement rate may correspond to an engagement for a given period of time and the subsequent engagement rate may correspond to a subsequent period of time. As an illustrative example, FIG. 5 shows a graph 500 representing a rate of engagement related to a media content at a first time 510 and a second time 520 where the X axis correspond to time and the Y axis corresponds to the engagement rate for the media content. As shown, the engagement rate 530 may change at a slower pace at time 510 and a faster pace at time 520. Accordingly, the arrangement may determine the change in engagement rate based on the engagement rate at 510 and the change in engagement rate at 520. According to an implementation, the engagement rate for a first time may be based on a number of engagements during the time range corresponding to the first time. For example, the time range may be 1 minute and the number of clicks to a link recorded during a first minute may be 30. The number of clicks to a link recorded during a second minute may be 40. Accordingly, the change in engagement rate may be +10 clicks (i.e., the increase in number of clicks) or +33% (i.e., the percentage increase between the first minute and the second minute). Alternatively, the arrangement may take an average number of engagements during a first time (e.g., a first minute) and compare it to an average number of engagements during a second range (e.g., a second minute). For example, the first engagement rate may be calculated for the a first minute during which the average engagement is 3 clicks/second and a second engagement rate may be calculate for a second minute during which the average engagement rate is 4 clicks/second. Accordingly, the change in engagement rate may be +1 click/second or +25%.

The change in engagement rate may be conducted by the arrangement via any applicable entity such as a local server, a remote server, a cloud based server, a database, a computer, or the like. The change in engagement rate may be provided from a first entity to a second entity to calculate a velocity measure or, alternatively, the velocity measure may be calculated at the first entity that calculates the change in engagement rate.

According to an implementation of the disclosed subject matter, as shown at step 340 of FIG. 3, a velocity measure for a media content may be calculated and may be based on a change in engagement rate associated with the media content. According to an implementation, the velocity measure may be the change in engagement rate itself. For example, if the change in engagement rate for a media content is +1 click/second then the velocity measure for the media content may also be +1 click/second. According to an implementation, the velocity measure may be based on a normalized change in engagement rate. The change in engagement rate may be normalized based on any applicable criteria such as based on a predetermined normalization rate (e.g., if the predetermined normalization rate is 4 clicks/second then by dividing an engagement rate by 4 to determine a velocity measure), based on a current highest engagement rate (e.g., based on a media content that currently has the highest change in engagement rate, essentially resulting in a velocity measure that ranks media content in view of the media content with the highest change in engagement rate), based on an overall highest engagement rate (e.g., based on a media content that historically has the highest change in engagement rate over a given period of time), or the like. As a specific example, the highest change in engagement rate during a given day may be associated with a first media content. The change in engagement rate for a publishable media content may be calculated based on dividing the change in engagement rate for the publishable media content by the change in engagement rate for the first media content (i.e., the highest change in engagement rate for the day).

According to an implementation of the disclosed subject matter, a velocity measure may be calculated based on one or more weights associated with one or more engagement rates and/or types of engagements. A type of engagement can be based on one or more of the source (the user (the "source user") and/or the site from which the media item is shared (the "source site")) of the engagement, the destination (the target user and/or destination site to which the media is shared) of the engagement, an attribute of the media being engaged (e.g., category, topic, length, size, authorship, metadata, keywords present in the media item), etc. The weights may be assigned to the one or more weights that are used to calculate the change in engagement rate for a media content. For example, as shown in FIG. 5, if a first engagement rate at 510 at a first time is compared to a second engagement rate at 520 at a second time, then a weight may be applied to the engagement rate associated with 510, 520, or both. For example, an engagement rate associated with a first time may not be weighted whereas the engagement rate associated with a second time may receive a 2× weight such that the engagement rate associated with the second time is counted twice as heavily as the first engagement rate. Accordingly, if the first engagement rate is 5 and the second engagement rate is 10, then the 2× weight may be applied to the second engagement rate such that the effective second engagement rate is 20. A velocity measure may be calculated by averaging the first engagement rate (i.e., 5) and the weighted second engagement rate (i.e., 20), resulting in a velocity measure of 12.5. Notably, a non-weighted velocity measure would be 7.5 based on the first engagement rate (i.e., 5) and non-weighted second engagement rate (i.e., 10). The weight associated with a first engagement rate may be different than a weight associated with a second engagement rate for the same media content. For example, an engagement rate associated with a first time may be weighted at 2× and the engagement rate associated with a second time may receive a 3× weight such that the engagement rate associated with the second time is counted 1.5 times as heavily as the first engagement rate. Accordingly, if the first engagement rate is 5 and the second engagement rate is 10, then the 2× weight may be applied to the first engagement rate such that the effective first engagement rate is 10 and a 3× weight may be applied to the second engagement rate such that the effective second engagement rate is 30. A velocity measure may be calculated by averaging the effective first engagement rate (i.e., 10) and the weighted second engagement rate (i.e., 30), resulting in a velocity measure of 20.

According to an implementation of the disclosed subject matter, the one or more weights associated with an engagement rate may be based on a recency of the one or more engagement rates. A heavier weight may be applied to an engagement rate that is more recent than an engagement rate that is less recent. For example, an engagement rate calculated at 2:15 pm, for a media content, may be weighted heavier than an engagement rate calculated at 1:15 PM the same day. Essentially, the arrangement may prioritize engagement rates that are more recent as they may more accurately indicate a trend in the popularity of a media content. Alternatively, a heavier weight may be applied to an engagement rate that is less recent than an engagement rate that is more recent. For example, an engagement rate calculated at 1:15 pm, for a media content, may be weighted heavier than an engagement rate calculated at 2:15 PM the same day. Essentially, the arrangement may prioritize engagement rates that are less recent as they may more definitively represent the popularity of a media content.

According to an implementation of the disclosed subject matter, the one or more weights associated with an engagement rate may be based on the type of the engagement rate. A type of engagement rate may be based on any action with respect to a media item such as a click, a share, a like, a suggestion, a post, a mention, or the like. A click may be selection of the media content or a link to the media item by a user. Here, the arrangement may process the clicks through fraud detectors such that illegitimate clicks are ignored (e.g., via bot detection software). A share may be associated with one or more users providing the media content to one or more other users. A share may occur via any applicable manner such as via an electronic mail, an account user interface, a website, a social media platform, Short Messaging Service message, software, an application, or the like. A like may be associated with a user approval of, agreement with, and/or support towards media content. A suggestion may be a recommendation of media content by a user. The suggestion may be directed at one or more other users or may be directed to a general population. A user may suggest specific media content another user via any applicable manner such as via an electronic mail, an account user interface, a website, a social media platform, Short Messaging Service message, software, an application, or the like. A post may be a publication of media content by a user such that one or more other users may view the publication. A mention may be any applicable reference to media content and may be embedded within text, a share, a suggestion, a post, or the like.

According to an implementation of the disclosed subject matter, the one or more weights associated with an engagement rate may be based on the type of media. A type of media may be any media type such as an image, a video, an audio, a graphics interchange format, and a text string. An image may be any applicable format such as a JPEG, a JFIF, an Exif, a TIFF, a RAW, a GIF, a BMP, a PNG, a PPM, a PMG, a PBM, a PNM, a PFM, a PAM, a WEBP, a HDR Raster, a PSD or the like. A video may be any applicable format such as an MPEG, an MPG, an MPE, a MOV, an AVI, a CAM, a DAT, an FLA, a SOL, an M4V, a WMV, or the like. An audio may be any applicable format such as a 3PG, an AIFF, an ATRAC, a M4A an M4P a TTA, a WAV, a WMA or the like. A text format may be any applicable format such as a TXT, a ASC, a CSV, a DOT, a DOTX, a HTML, an ODT, an XPS, and XML, an XHTML, a PDF, or the like.

According to an implementation of the disclosed subject matter, as shown at step 350 of FIG. 3, the arrangement may determine that a velocity measure exceeds a velocity threshold. A velocity threshold may be provided by a user or may be determined by the arrangement. A user may provide a velocity threshold in any applicable manner such as via a user interface, prior to the arrangement identifying a media content, via an interface after a media content is identified by the arrangement, or the like. For example, a user may be prompted to input a velocity threshold prior to the arrangement identifying media content. The user may input a velocity threshold of 6.5 such that the arrangement determines that a velocity measure associated with a media content exceeds the velocity threshold when the velocity measure for the media content exceeds 6.5. Essentially, media content for which the velocity measure exceeds a velocity threshold may be considered potentially viral media.

Alternatively, a velocity threshold may be determined dynamically based on any applicable criteria such as an advertising campaign, a different media content, or the like. An advertising campaign may be one or more advertisements in any applicable format (e.g., image, video, audio, text, etc.) that may be associated with media content. As a specific example, an advertising campaign for sweaters may be configured such that the sweater manufacture indicates that they will pay X amount if their advertisements are associated with media content that is very popular and relevant to sweaters. Accordingly, the arrangement may determine that media content related to clothing articles is considered to be very popular at the velocity threshold of 6.0 based on clothing article media content for the past week. Therefore, the velocity threshold may be 6.0 based on the determination. As another example, on a given day, the average media content velocity measure for identified media content may be 4.0. The arrangement may determine that a velocity threshold is 200% of the average velocity measure on a given day. Accordingly, on the given day with the average velocity measure of 4.0, the arrangement may determine that the velocity threshold is 8.0 (200% of 4.0).

According to an implementation of the disclosed subject matter, as shown in FIG. 3, at step 360, media related to the media content may be published based on determining that the velocity measure for the media content exceeds the velocity threshold. The related media may be published on a media outlet such as a website, a blog, an aggregation page, an application, or the like. For example, the related media content may be published on a website that includes a plurality of related media content based on a plurality of original media content.

According to an implementation of the disclosed subject matter, the related media may be any type of media such as a link, an image, a video, an audio, a graphics interchange format, and a text string. A link may be any applicable pointer to another interface such as a web resource identifier (e.g., a uniform resource locator, a uniform resource name, a uniform resource identifier, etc.), or the like. An image may be any applicable format such as a JPEG, a JFIF, an Exif, a TIFF, a RAW, a GIF, a BMP, a PNG, a PPM, a PMG, a PBM, a PNM, a PFM, a PAM, a WEBP, a HDR Raster, a PSD or the like. A video may be any applicable format such as an MPEG, an MPG, an MPE, a MOV, an AVI, a CAM, a DAT, an FLA, a SOL, an M4V, a WMV, or the like. An audio may be any applicable format such as a 3PG, an AIFF, an ATRAC, a M4A an M4P a TTA, a WAV, a WMA or the like. A text format may be any applicable format such as a TXT, a ASC, a CSV, a DOT, a DOTX, a HTML, an ODT, an XPS, and XML, an XHTML, a PDF, or the like. The related media may contain an original media content on which the media content is based on. As an example, an original content may be a video showing a test drive of a new supercar. The related media content may be an article that describes the features and stylistic points of the new supercar. Alternatively or in addition, the related media content may be an article describing the new supercar as well as an embedded version (e.g., embedded into the webpage) of the video. Related media content may be a derivative of corresponding original media content. As an example, original media content may be a recently released song. Related media content corresponding to the recently released song may be a derivative of the song such that the related media may be they lyrics associated with the song. Related media content may be automatically generated or may be provided by a user. As an example, related media content may be automatically generated and may be a link to an original media content such that selection of the link directs a user to the original media content. As another example, the arrangement may automatically extract a video clip and embed the video clip into a webpage other than the original location of the video clip. As an example of user provided related media content, a user may be exposed to media content and, based on the exposure, may draft an article discussing the media content. The drafted article may be the related media content.

As an example of an implementation of the disclosed subject matter, the arrangement may scan a community based website. The arrangement may identify a link to a music video from a comment on the community based website. The arrangement may determine that the link the music video has been shared 100 times within the blog as well as one other social media website that is monitored by the arrangement. Accordingly, the music video may be identified and stored at a remote server, based on the 100 shares. The arrangement may determine a change in engagement rate for the music video by determining the engagement rate for the music video on a first day and comparing to the engagement rate for the music video on a second day. The arrangement may determine that the change in engagement rate is 4 engages. Additionally, the arrangement may determine that the highest change in engagement rate for media content during a given week is 6 engages. The music video's change in engagement rate (i.e., 4 engages) may be normalized against the highest change in engagement rate (i.e., 6 engages) to generate a velocity measure of 0.66 for the music video. A velocity threshold of 0.5 may be generated by the arrangement and the music video may exceed the velocity threshold (i.e., 0.66>0.5). Accordingly, the arrangement may publish an article about the music video that contains the music video embedded within the article along with text associated with the music video. The article may be published on a media website that also contains one or more other related media items such that the one or more other related media items correspond to other media content, the other media content's velocity measure exceeding the velocity threshold (e.g., the same velocity threshold of 0.5 or a different velocity threshold). Essentially, here, the music video may be designated as potentially viral based on exceeding the velocity threshold and publishing the article related to the music video may catalyze the music video becoming viral.

Figure 6A:
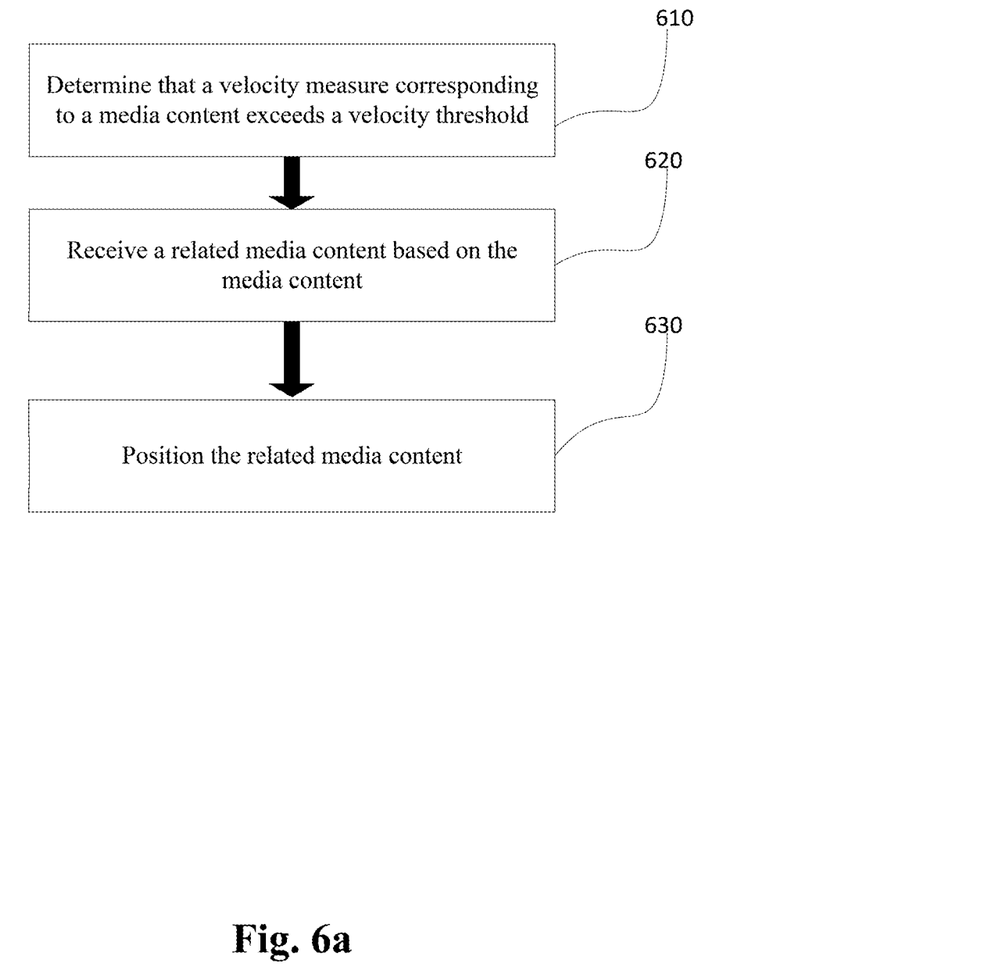
FIG. 6a shows an example process for positioning publishable media content, according to an implementation of the disclosed subject matter.

According to an implementation of the disclosed subject matter, as shown in FIG. 6, at step 610, the arrangement may determine that a velocity measure corresponding to a media content exceeds at least one location velocity criterion, such as a location velocity threshold or range. The location velocity criterion may be a velocity threshold or range that can be assigned to a position on a site or device. A position can be a region or a point. For example, a position can be a lower-left region of a user interface (e.g., a website, a blog, a search results page, etc.) A position can be defined in any suitable way. For example, it can be defined as a region of 240×180 pixels, with the upper left corner of established at a given location on the screen. When the position is a point, it can also be defined in any suitable way, such as by an (x,y) coordinate, an offset from another point, etc. The location velocity criterion can be used to establish points or zones in the user interface where media having given velocities may be shown. For example, a lower left position may be reserved for news stories having low velocities and an upper right position may be reserved for news stories having high velocities. When the velocity of a media item changes, it may be moved from one zone to another. For example, a lower left zone having a position velocity range of 1-10 may include a news story having a velocity of 7. If the velocity of the story increases to 11, the story may be moved to an upper right zone having a position velocity range of 11-20. When the position is a point, no part of a story may be permitted to be displayed at that point unless it meets the position velocity criteria for that point. In another implementation, only an defined border of a story that does not meet the point's position velocity criteria may be permitted to be shown at that point. Position velocity criteria can be manipulated to control the position of media items on a user interface based on the velocities of the media items. Placing a media item in a given position can improve the likelihood that the media item will go viral. For example, if users know that the most popular stories are shown at the upper right of a site, they may be more likely to engage with them. In an implementation, a media item can be selected to be shown in a position having position velocity criteria higher than that of the media item. The popularity of the media item can be monitored, and if its velocity fails to increase to meet the position velocity criteria (e.g. within a certain amount of time), then it can be removed from that position.

The velocity measure may be based on a change in engagement rate, as disclosed herein. The location velocity criterion may be the same as or based on the velocity threshold applied in step 350 of FIG. 3. As shown at step 620 of FIG. 6, the arrangement may receive related media content that is based on the media content, as disclosed herein. At step 630, the related media content may be positioned on any applicable media outlet such as a website, a blog, an aggregation page, an application, or the like.

As shown at step 610 in FIG. 6, the arrangement may determine that a velocity measure corresponding to a media content exceeds a location velocity criterion. A location velocity criterion may be provided by a user or may be determined by the arrangement. A user may provide a location velocity criterion in any applicable manner such as via a user interface, prior to the arrangement identifying a media content, via an interface after a media content is identified by the arrangement, or the like. For example, a user may be prompted to input a location velocity criterion prior to the arrangement identifying media content. The user may input a location velocity criterion of 5.0 such that the arrangement determines that a velocity measure associated with a media content exceeds the location velocity criterion when the velocity measure for the media content exceeds 5.0. Alternatively, a location velocity criterion may be determined dynamically based on any applicable criteria such as an advertising campaign, a different media content, or the like. An advertising campaign may be one or more advertisements in any applicable format (e.g., image, video, audio, text, etc.) that may be associated with media content. As a specific example, an advertising campaign for shirts may be configured such that the shirt manufacture indicates that they will pay a Y amount if their advertisements are associated with media content that is very visibly positioned and relevant to shirts. Accordingly, the arrangement may determine that related media content that is currently positioned within very visible sections of an aggregate webpage has an average velocity measure of 4.5. Therefore, the arrangement may determine that the location velocity criterion of 4.5 is required for a related media content to be positioned in the very visible portion of the aggregate website. As another example, on a given day, the average velocity measure for media content that is positioned on a media outlet may be 5.0. The arrangement may determine that a location velocity criterion of 90% of the average velocity measure on a given day is applicable. Accordingly, on the given day with the average velocity measure of 5.0, the arrangement may determine that the velocity threshold is 4.5 (90% of 5.0).

Media content for which the velocity measure meets a position velocity criteria associated with a media outlet may qualify to be positioned on a media outlet. Additionally, the media content for which the velocity measure exceeds a position velocity criteria may be designated as potentially viral to a degree where the arrangement determines that the media content should be presented to one or more users.

Figure 6B:
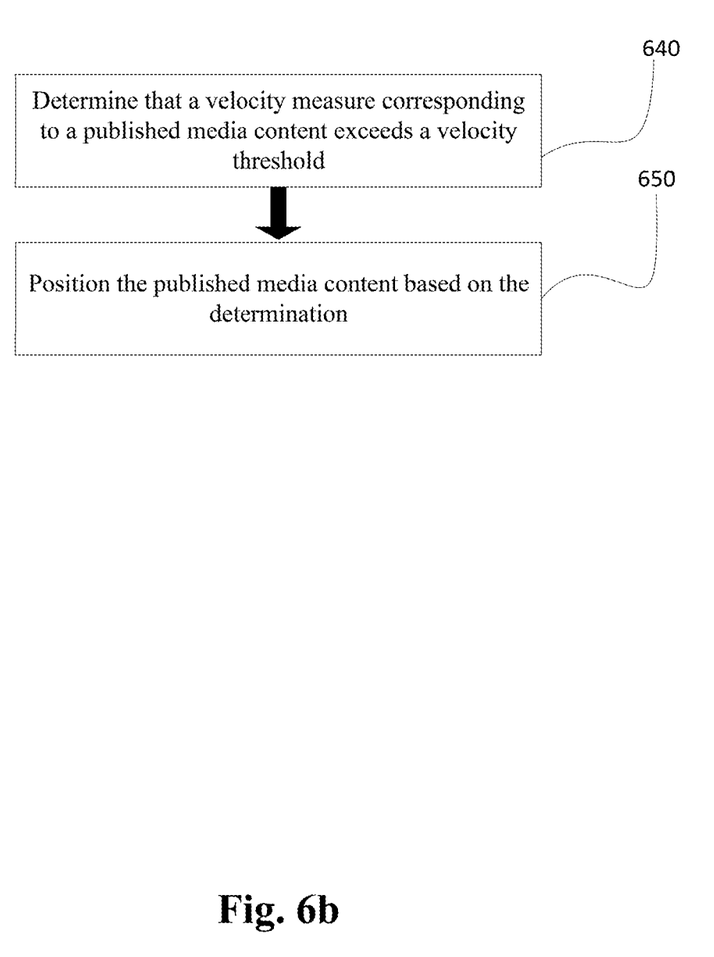
FIG. 6b shows another example process for positioning publishable media content, according to an implementation of the disclosed subject matter.

As shown at step 620 in FIG. 6, the arrangement may receive a related media content based on a media content. As disclosed herein, related media content may be any type of media such as a link, an image, a video, an audio, a graphics interchange format, and a text string. A link may be any applicable pointer to another interface such as a web resource identifier (e.g., a uniform resource locator, a uniform resource name, a uniform resource identifier, etc.), or the like. An image may be any applicable format such as a JPEG, a JFIF, an Exif, a TIFF, a RAW, a GIF, a BMP, a PNG, a PPM, a PMG, a PBM, a PNM, a PFM, a PAM, a WEBP, a HDR Raster, a PSD or the like. A video may be any applicable format such as an MPEG, an MPG, an MPE, a MOV, an AVI, a CAM, a DAT, an FLA, a SOL, an M4V, a WMV, or the like. An audio may be any applicable format such as a 3PG, an AIFF, an ATRAC, a M4A an M4P a TTA, a WAV, a WMA or the like. A text format may be any applicable format such as a TXT, a ASC, a CSV, a DOT, a DOTX, a HTML, an ODT, an XPS, and XML, an XHTML, a PDF, or the like. The related media may contain an original media content on which the media content is based on. As an example, an original content may be a video showing a test drive of a new supercar. The related media content may be an article that describes the features and stylistic points of the new supercar. Alternatively or in addition, the related media content may be an article describing the new supercar as well as an embedded version (e.g., embedded into the webpage) of the video. Related media content may be a derivative of corresponding original media content. As an example, original media content may be a recently released song. Related media content corresponding to the recently released song may be a derivative of the song such that the related media may be they lyrics associated with the song or may be article that discusses the recently released song. Related media content may be automatically generated or may be provided by a user. As an example, related media content may be automatically generated and may be a link to an original media content such that selection of the link directs a user to the original media content. As another example, the arrangement may automatically extract a video clip and embed the video clip into a webpage other than the original location of the video clip. As an example of user-provided related media content, a user may be exposed to media content and, based on the exposure, may draft an article discussing the media content. The drafted article may be the related media content. According to an implementation, as shown in FIG. 6b, the arrangement may identify an original content to be positioned based on a location velocity criterion, as disclosed herein. The original content or a link to the original content may be published at a first position and a velocity measure may be calculated for the published media content. Based on exceeding a velocity threshold at step 640, the position of the original content may be modified at 650.

As shown at step 630 of FIG. 6, the arrangement may position the related media content based on a corresponding velocity measure exceeding a location velocity criterion. The position of related media content may correspond to the visibility of a media item. Essentially, positioning a first media item at a first position may result in a higher probability of the media item being viewed when compared to a second media item located in a second position different from the first position. As applied herein, positioning may include any applicable attribute such as location, size, surrounding, and the like. A location may correspond to the actual space that a media item is situated at. As an example, a media item may either be placed on the left hand portion of a webpage, the middle portion of the webpage, or a right hand portion of a webpage. Here, each portion may have a different probability of subsequent visibility associated with it. A size may correspond to an image or video size, a font size, an area occupied, or the like associated with a media item. As an example, a media item may be sized at 100 by 100 pixels or 200 by 200 pixels based on a location velocity criterion, as disclosed herein. A surrounding may correspond to an area that is next to, around, or near a related media content. A surrounding may draw attention to a related media content such as, for example, the surrounding may be a highlight such that the color corresponding to the area around a related media content is more visibly noticeable than the color around the rest of the webpage within which the related media content is located.

According to an implementation of the disclosed subject matter, the arrangement may determine at least one of a plurality of media outlets via which to publish a media content. The at least one media outlet may be selected based on a location velocity criterion. As an example a first media outlet may be selected if the location velocity criterion is below 5 whereas a second media outlet may be selected if the location velocity criterion is above 5. Alternatively or in addition, the media outlet may be selected based on the deviation from a location velocity criterion. For example, if the location velocity criterion is 6, then media content related to media content that has a velocity measure within 2 points of the location velocity criterion (i.e., between 6 and 8) may be positioned at a first media outlet whereas if the media content has a velocity measure that is greater than 2 points above the location velocity criterion then the media content may be positioned at a second media outlet. Alternatively or in addition, the media outlet may be selected based on the type of related media content. The type of related media content may be any media type such as an image, a video, an audio, a graphics interchange format, a text string, or the like, as disclosed herein. As an example, if the related media content is a video, it may be positioned on a first media outlet whereas if the related media content is text based, then it may be positioned on a different media outlet.

Figure 7:
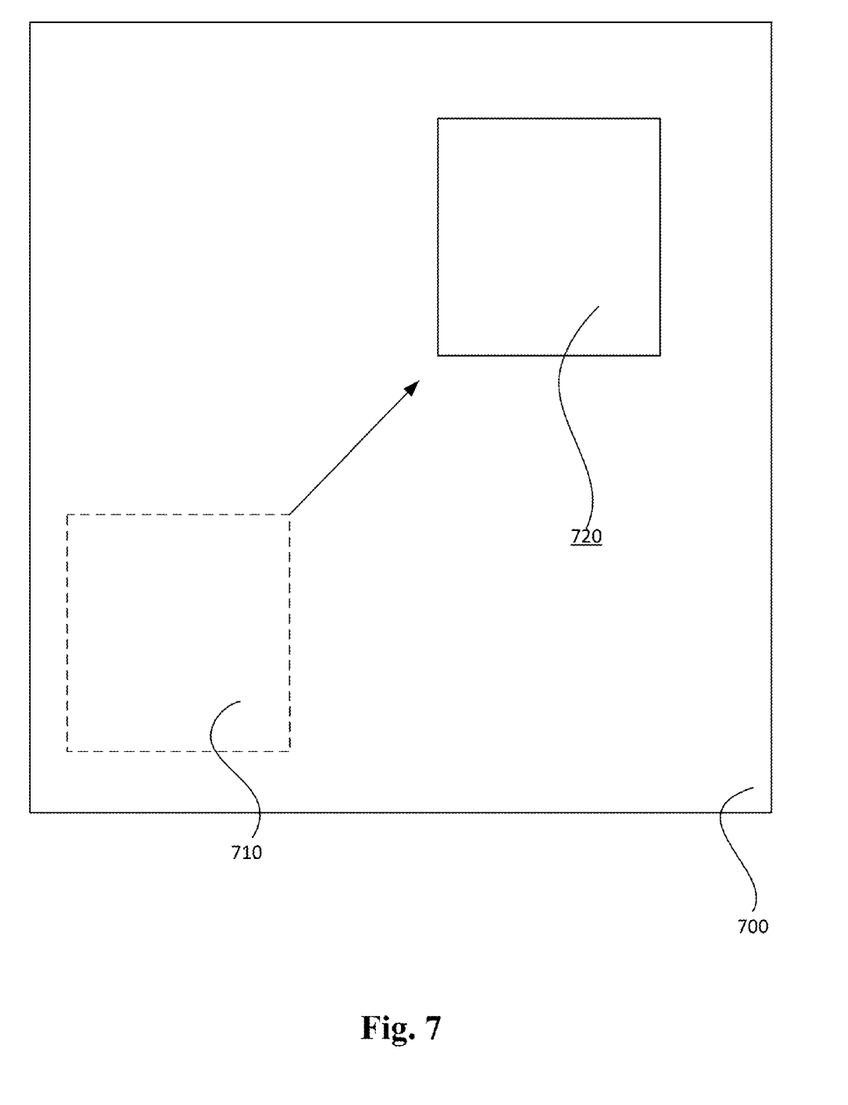
FIG. 7 shows an example illustration of positioning publishable media content, according to an implementation of the disclosed subject matter.

According to an implementation of the disclosed subject matter, the arrangement may determine a location for a publishable media content (e.g., a related media content or original media content), within a media outlet. The location within a media outlet may be the position of a publishable media content within a single page, selection of a page on which to place the publishable media content, or selection of a page as well as a location of the page on which to place the publishable media content. A page may be a webpage such that multiple webpages may constitute a website when considered in combination, a single view of an application or program such that a different view may contain different content not visible while viewing the first view, or the like. As an illustrative example of a location within a page, as shown in FIG. 7, the arrangement may determine whether to place a publishable media content at a first location 710 or a second location 720. Here, the second location 720 may be a location that increases the probability of a user viewing the second publishable content in comparison to the first location 710.

According to an implementation of the disclosed subject matter, the arrangement may determine that a publishable media content (e.g., a related media content or original media content) is located at a first location, identify a second location, and modify the location of the related media content from the first location to the second location. The arrangement may modify the location of a publishable media content for any applicable reason such as if the velocity measure for the media content that corresponds to the publishable media content exceeds a certain velocity measure, if a user indicates that the publishable media content should be relocated, or the like. As an illustrative example, as shown in FIG. 7, a publishable media content may be located at a first location 710. The velocity measure for the media content corresponding to the publishable media content may increase from 5 to 7 and, based on the increase, the arrangement may modify the position of the publishable media content from the first location 710 to a second, more visible, location 720. It will be understood that the publishable media content may be positioned at a media outlet based on a first location velocity criterion and the arrangement may modify the location of the publishable media content based on a second location velocity criterion (e.g., a minimum velocity measure of 7 according to the previous example).

Figure 8:
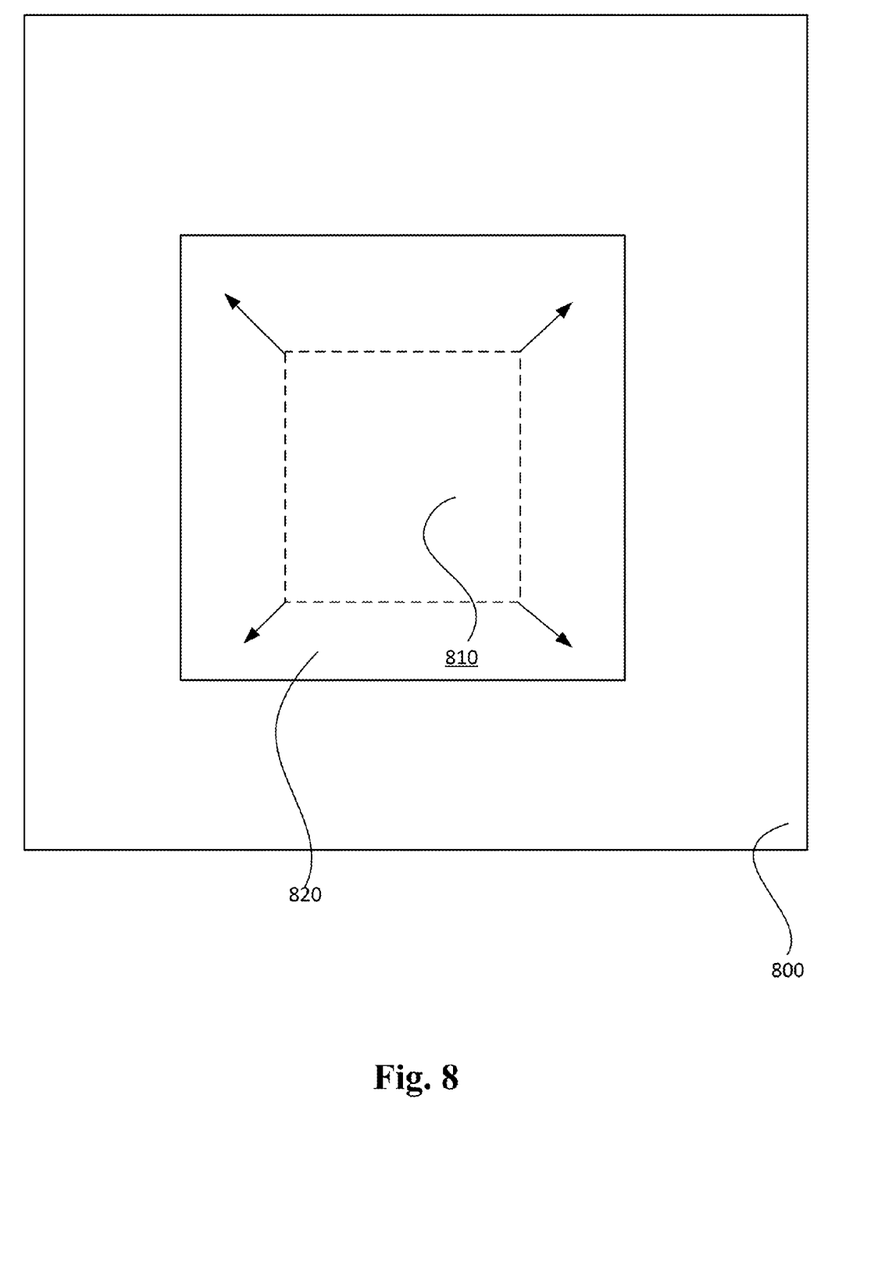
FIG. 8 shows another example illustration of positioning publishable media content, according to an implementation of the disclosed subject matter.

According to an implementation of the disclosed subject matter, the arrangement may increase the size of a publishable media content. The arrangement may identify that publishable media content is located at a first location and may maintain the publishable media content at the same location while increasing the size of the publishable media content. The arrangement may increase the size of the publishable media content for any applicable reason such as to increase the visibility of the publishable media content, to occupy more space, or the like. Additionally, the arrangement may also modify the size and/or location of other items on an interface in order to make space for the larger publishable media content. As an illustrative example, as shown in FIG. 8, a publishable media content may originally occupy the space illustrated by box 810 within webpage 800. The velocity measure for the media content corresponding to the publishable media content may increase from 5 to 7 and, based on the increase, the arrangement may increase the size of publishable media content such that the larger publishable media content may occupy the amount of space illustrated by box 820 within webpage 800. Alternatively, the arrangement may modify the location of a publishable media content as well as increase the size of the publishable media content. It will be understood that the publishable media content may be sized within at a media outlet based on a first location velocity criterion and the arrangement may modify the size of the publishable media content based on a second location velocity criterion (e.g., a minimum velocity measure of 7 according to the previous example).

Figure 9:
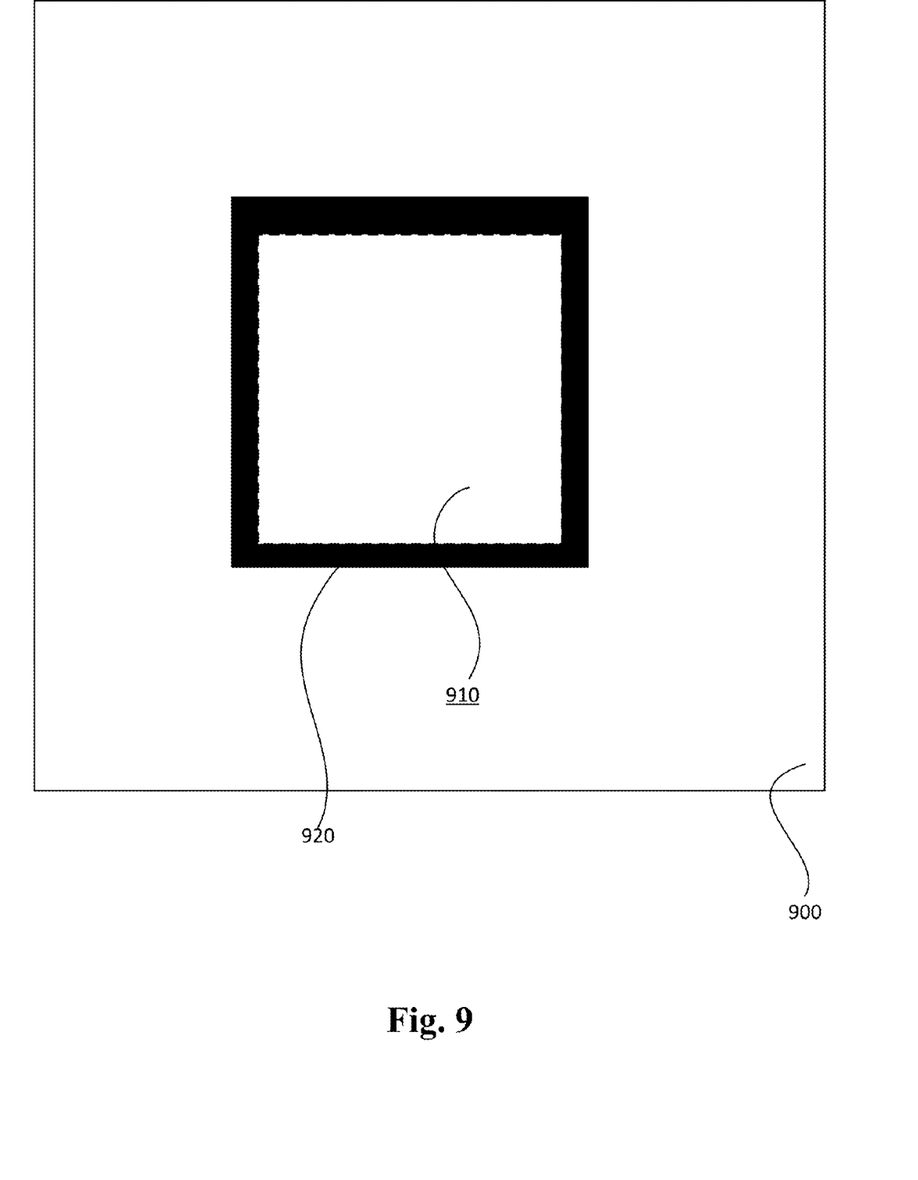
FIG. 9 shows an example illustration of highlighting publishable media content, according to an implementation of the disclosed subject matter.

According to an implementation of the disclosed subject matter, the arrangement may highlight a publishable media content. A highlight may be any applicable manner of visually distinguishing a publishable media content in comparison to other content on the same graphical interface as the publishable media content. A highlight may include surrounding publishable media content with a visibly noticeable color, flashing the publishable media content or an area near the publishable media content, or the like. As an illustrative example, as shown in FIG. 9, a webpage 900 may contain a publishable media content located at 910. The velocity measure for the media content corresponding to the publishable media content may increase from 5 to 7 and, based on the increase, the arrangement may highlight 920 the publishable media content by changing the color around the publishable media content. It will be understood that the publishable media content may be sized within at a media outlet based on a first location velocity criterion and the arrangement may modify the size of the publishable media content based on a second location velocity criterion (e.g., a minimum velocity measure of 7 according to the previous example). Alternatively or in addition, a highlight may contain an alert. An alert may be any applicable technique that directs attention to a publishable media content such as a message, a new graphical user interface, an indication, or the like.

Figure 4:
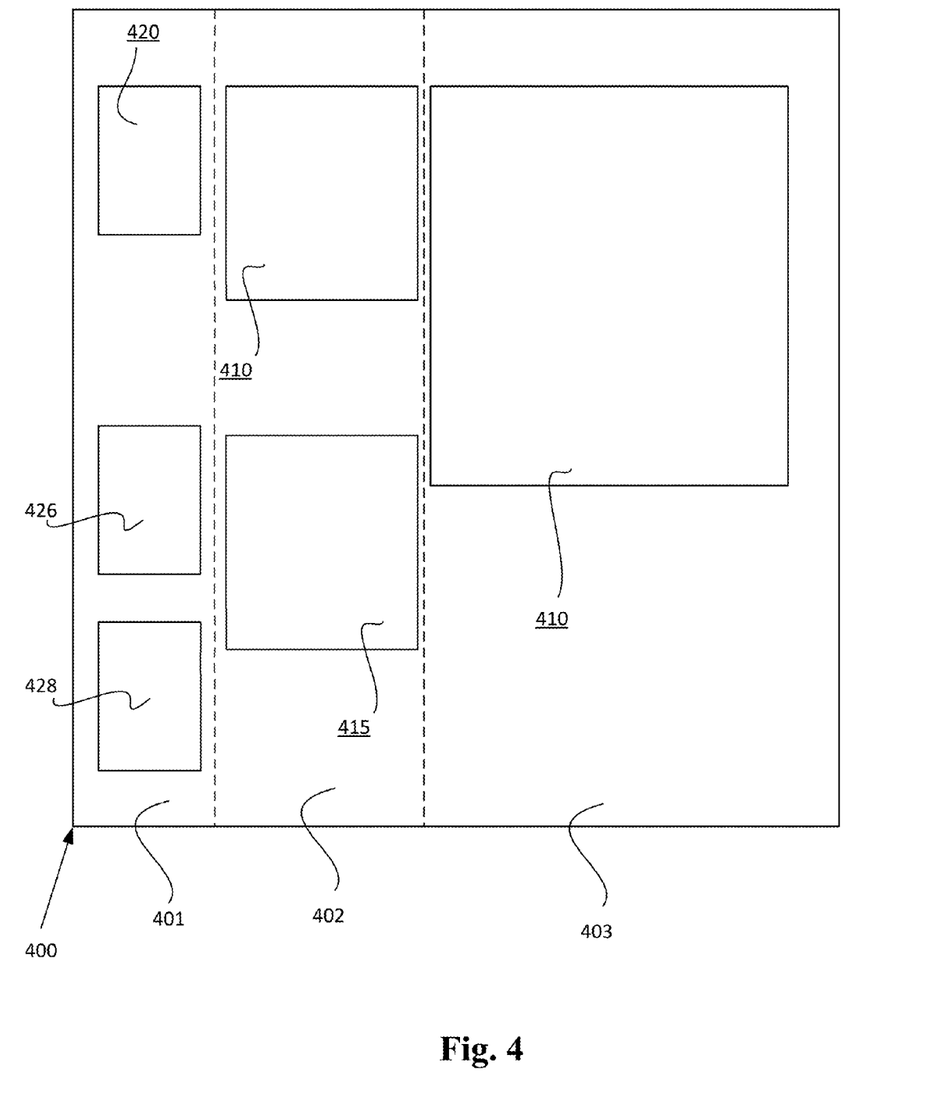
FIG. 4 shows an example illustration for publishing publishable media content, according to an implementation of the disclosed subject matter.

According to an implementation of the disclosed subject matter, a media outlet may have one or more zones. The one or more zones may have a probability of visibility associated with the zone. For example, as shown in FIG. 4, a webpage 400 may contain three zones 401, 402, and 403. Here, publishable content located in the first zone 401 may have less visibility than publishable content in the second zone 402, and publishable content in the second zone 402 may have less visibility than publishable content in the third zone 403. The arrangement may select a zone to publish publishable media content based on any applicable attribute associated with a zone such as a visibility probability, a time based categorization by zone, a type of content, or the like. As an example, the arrangement may determine that the first zone 401 in FIG. 4 contains any publishable content that is an image. Accordingly, the arrangement may determine that a publishable content 420 is an image and, thus, publish the image within the first zone 401.

According to an implementation of the disclosed subject matter, two zones may be temporally associated with each other. The temporal association may be such that a first zone may contain publishable content that is published at a time that is before the time at which publishable content is published in a second zone. As an illustrative example, as shown in FIG. 4, the first zone 401 may contain publishable media content that is the most recent, the second zone 402, the second most recent, and the third zone 403 the least recent. Here, the arrangement may operate such that the first zone contains publishable media content for which an associated velocity measure recently exceeded a location velocity criterion. The second zone may contain publishable media content such that media content for which an associated velocity measure exceeded a location velocity criterion for longer than the publishable content in the first zone. The third zone may contain publishable media content such that media content for which an associated velocity measure exceeded a location velocity criterion for longer than the publishable content in the second zone.

According to an implementation of the disclosed subject matter, one or more zones may have zone criteria, such as threshold velocity or velocity range measures associated with the respective zones. As an example, a first zone may have a first zone velocity measure, a second zone may have a second zone velocity measure, and a third zone may have a third zone velocity measure. Accordingly, a publishable media content may be placed in a zone if the velocity measure associated with the publishable media content exceeds the respective zone's velocity threshold. As an illustrative example, as shown in FIG. 4, the first zone 401 may contain a first zone velocity threshold of 4, the second zone 402 may contain a second zone velocity threshold of 6, and the third zone 403 may contain a third zone velocity threshold of 8. Accordingly if the associated velocity measure corresponding to a publishable content is between 4 and 5.9 then the publishable content may be published in the first zone, if it is between 6 and 7.9, then in the second zone, and if 8 or above, then in the third zone. Accordingly, as an associated velocity for publishable media content increases, the publishable media content may be removed from a first zone to a second zone. As shown in FIG. 4, publishable media content may vary in size between zones. Here, publishable media content 420, 426 and 428 in the first zone may be smaller in size compared to the media content 410 and 415 in the second zone. Further, the media content 410 and 415 in the second zone may be smaller in size compared to the media content 410 in the third zone. For example, the visual density for the zones may vary such that a zone with a lower visual density may be more appealing to a user viewing the media outlet when compared to a zone with a higher density. The velocity density may be a number of media items per unit area such that a larger number of media items within a zone results in a higher visual density zone. As an illustrative example, as shown in FIG. 4, relative media content in zone three 403 may be more appealing to a user viewing the webpage 400 than zone one 401.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   determining that a velocity measure corresponding to a first media content exceeds at least one location velocity criterion, wherein the velocity measure is based on a change in engagement rate for the first media content, wherein one or more weights associated with the engagement rate are based on a type of the engagement rate, and wherein the one or more weights are based on a time series for the engagement rate that is based on different types of interactions, where each of the types are weighted differently;
   receiving a publishable media content based on the first media content; and
   positioning the publishable media content based on determining that the velocity measure corresponding to the first media content exceeds at least one location velocity criterion.

2. The method of claim 1, further comprising generating the first media content.

3. The method of claim 1, wherein the first media content includes at least one selected from the group consisting of: an image, a video, a text, an audio, and a link.

4. The method of claim 1, wherein the publishable media content includes at least one selected from the group consisting of: an image, a video, a text, an audio, and a link.

5. The method of claim 1, wherein the publishable media content contains content similar to the first media content.

6. The method of claim 1, wherein the publishable media content is a derivative of the first media content.

7. The method of claim 1, wherein the publishable media content contains a link to the first media content.

8. The method of claim 1, wherein positioning the publishable media content comprises:
   selecting a media outlet; and
   publishing the publishable media content on the selected media outlet.

9. The method of claim 1, wherein positioning the publishable media content comprises:
   determining a location for the publishable media content on a media outlet; and
   publishing the publishable media content at the determined location.

10. The method of claim 1, wherein positioning the published media content comprises:
    determining a first location of the publishable media content on a media outlet; and
    determining a second location for the publishable media content on the media outlet; and
    modifying the location of the publishable media content from the first location to the second location.

11. The method of claim 1, wherein positioning the publishable media content comprises:
    determining a first location of the publishable media content on a media outlet; and
    increasing the size of the publishable media content.

12. The method of claim 1, wherein positioning the publishable media content comprises:
    determining a first location of the publishable media content on a media outlet; and
    highlighting the publishable media content.

13. The method of claim 12, wherein the highlight comprises an alert.

14. The method of claim 1, wherein positioning the publishable media content comprises:
    selecting a zone on a media outlet having a first zone, a second zone, and a third zone; and publishing the publishable media content based on the selected zone.

15. The method of claim 14, wherein the first zone corresponds to recently publishable media items.

16. The method of claim 14, wherein the second zone corresponds to media items having velocity measures that exceed a second zone velocity threshold.

17. The method of claim 14, wherein the third zone corresponds to media items having velocity measures that exceed a third zone velocity threshold.

18. The method of claim 14, wherein the first zone has a first visual density of media items and the second zone has a second visual density of media items, wherein second visual density is lower than the first visual density.

19. The method of claim 18, wherein the visual density is the number of media items per unit area.

20. The method of claim 18, wherein positioning the publishable media content further comprises:
   removing the publishable media content from the first zone; and
   publishing the publishable media content in the second zone.

21. The method of claim 14, wherein the second zone has a second visual density of media items and the third zone has a third visual density of media items, wherein third visual density is lower than the second visual density.

22. The method of claim 21, wherein positioning the publishable media content further comprises:
   removing the publishable media content from the second zone; and
   publishing the publishable media content in the third zone.

23. A method comprising:
   determining that a velocity measure corresponding to a published media content exceeds at least one location velocity criterion, wherein the velocity measure is based on a change in engagement rate for the published media content, wherein one or more weights associated with the engagement rate are based on a type of the engagement rate, and wherein the one or more weights are based on a time series for the engagement rate that is based on different types of interactions, where each of the types are weighted differently; and
   positioning the published media content based on determining that the velocity measure corresponding to the first media content exceeds at least one location velocity criterion.

24. The method of claim 23, wherein the published media content includes at least one selected from the group consisting of: an image, a video, a text, an audio, and a link.

* * * * *